J. THOMAS.
Churn Dasher.
No. 64,460.
Patented May 7, 1867.
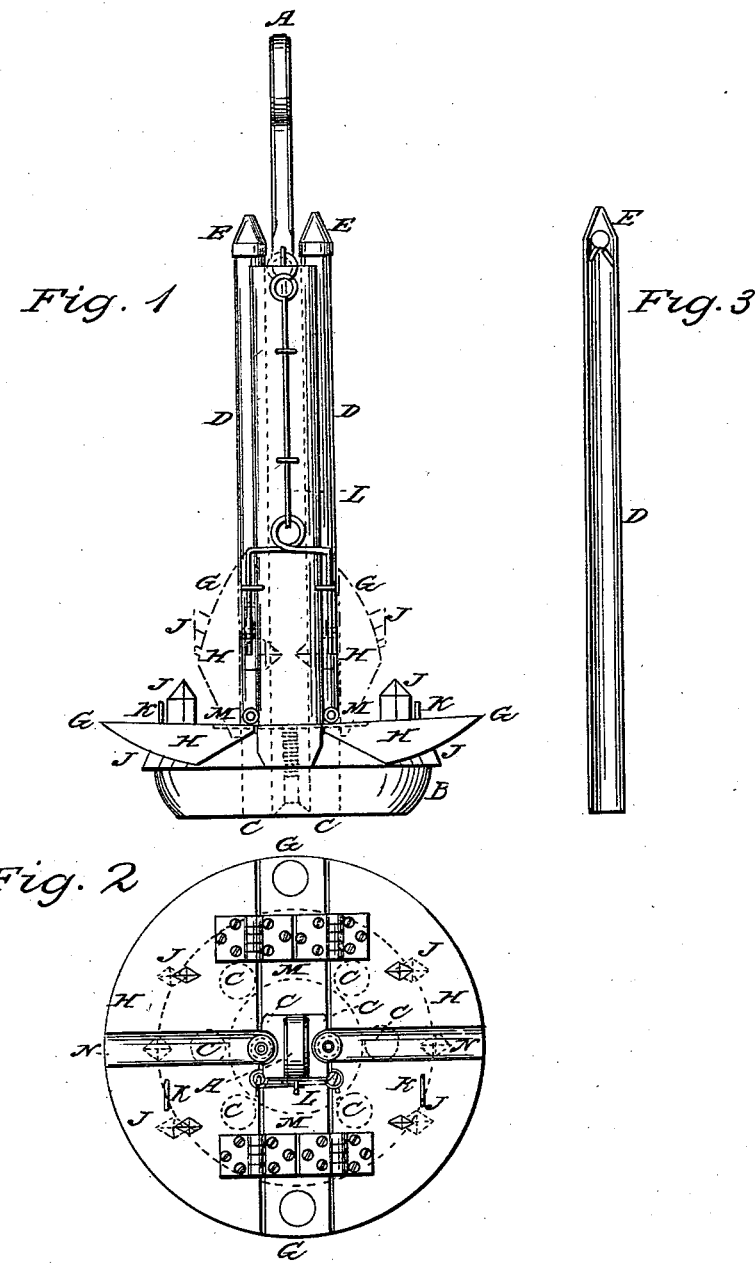

United States Patent Office.

JOHNSTON THOMAS, OF HUNTINGDON, PENNSYLVANIA.

Letters Patent No. 64,460, dated May 7, 1867.

---

CHURN-DASHER.

---

The Schedule referred to in these Letters Patent and making part of the same.

---

TO ALL WHOM IT MAY CONCERN:

Be it known that I, JOHNSTON THOMAS, of Huntingdon, county of Huntingdon, and State of Pennsylvania, have invented new and useful improvements in the Dashers of Churns; and I do hereby declare the following to be an exact description thereof, reference being had to the accompanying drawings, and to the letters of reference marked thereon, making a part of this specification, in which—

Figure 1 represents an upright view of the shaft, with its atmospheric tubes, dashers, and operating hooks.

Figure 2, a top view of the dashers.

Figure 3, one of the tubes, with its ball-valve at top.

The nature of my invention consists in the adjustable dasher and butter-gatherer, the lower perforated circular dasher, the adjusting-rod and hooks, the atmospheric tubes, with their ball-valves at top, all in combination.

A represents the upright shaft, intended to be used and operated in an upright churn. B is a circular flat dasher at the bottom of the shaft A, permanently fastened to the shaft, and containing eight apertures, C. The two centre apertures contain the atmospheric tubes D, having ball-valves E at top. On the top of the dasher B is another circular dasher, G, fastened to the dasher B and to the shaft A. This dasher G has two side wings H H, and projecting pins J J, on the upper and lower sides of the wings, that are four-square and pointed at their outer ends, and operate as breakers of the cream. An eye, K, is fastened on the top of each wing H, that fastens into the hooked ends of the adjustable rod L, that serves to hold up the wings H against the shaft A, and when up the wings operate as a dasher, and when down they are then a butter-gatherer. The wings operate on hinges M M, and have a groove, N, across each wing. The red lines show the wings H H raised and held up by the hooks on the lower end of rod L.

What I claim as my invention, and desire to secure by Letters Patent, is—

The adjustable dasher and butter-gatherer H and G, the lower perforated circular dasher B, the adjusting rod L, the atmospheric tubes D, with their ball-valves E at top, all in combination, when constructed, arranged, and operated as herein described, and for the purposes set forth.

JOHNSTON THOMAS.

Witnesses:
J. FRANKLIN REIGART,
JOHN S. HOLLINGSHEAD.